(12) United States Patent
Masamoto

(10) Patent No.: US 7,234,854 B2
(45) Date of Patent: Jun. 26, 2007

(54) ILLUMINATING DEVICE, ELECTRO-OPTICAL DEVICE, AND ELECTRONIC APPARATUS

(75) Inventor: Taketoshi Masamoto, Matsumoto (JP)

(73) Assignee: Seiko Epson Corporation (JP)

( * ) Notice: Subject to any disclaimer, the term of this patent is extended or adjusted under 35 U.S.C. 154(b) by 220 days.

(21) Appl. No.: 11/020,015

(22) Filed: Dec. 21, 2004

(65) Prior Publication Data

US 2005/0141065 A1 Jun. 30, 2005

(30) Foreign Application Priority Data

Dec. 22, 2003 (JP) ............................. 2003-424697
Nov. 17, 2004 (JP) ............................. 2004-332739

(51) Int. Cl.
*F21V 7/04* (2006.01)
*G09G 3/36* (2006.01)
*G02F 1/1335* (2006.01)

(52) U.S. Cl. ...................... 362/612; 362/613; 362/616; 362/617; 362/607; 347/113; 345/102

(58) Field of Classification Search ................ 362/603, 362/606, 607, 608, 609, 615, 616–617; 349/61, 349/62, 65, 74, 114, 113; 361/680–683; 455/566; 345/102, 4, 5, 6, 112
See application file for complete search history.

(56) References Cited

U.S. PATENT DOCUMENTS 6,801,271 B2 * 10/2004 Han et al. ...................... 349/74

7,001,059 B2 * 2/2006 Han et al. .................... 362/616
7,034,799 B2 * 4/2006 Lee ............................ 345/102
2004/0100423 A1 * 5/2004 Nagakubo et al. ............ 345/40
2004/0257819 A1 * 12/2004 Chou et al. .................. 362/368
2005/0035939 A1 * 2/2005 Akiyama ..................... 345/102
2005/0073627 A1 * 4/2005 Akiyama ..................... 349/65

FOREIGN PATENT DOCUMENTS

JP 2002-229499 8/2002
JP 2003-121655 4/2003

* cited by examiner

*Primary Examiner*—Thomas M. Sember
(74) *Attorney, Agent, or Firm*—Harness, Dickey & Pierce, P.L.C.

(57) ABSTRACT

An illuminating device is provided for use as a backlight of a liquid crystal display, and has a plurality of light sources and a light guiding plate emitting lights from the light sources outward. At least one of the light sources is configured to be lighted independently from the rest of the light sources. This illuminating device is applied to equipment such as a two surface display type cellular phone and is disposed between a main panel and a sub-panel to illuminate both panels. All light sources may be used to illuminate the main panel when the main panel is used, and some of the light sources may be used to illuminate only an area of the sub-panel when the sub-panel is used so that effective illumination may be implemented. Accordingly, light sources need not to be unnecessarily lighted when the sub-panel is used, which leads to low power consumption.

7 Claims, 7 Drawing Sheets

| PANEL SIZE | MAIN PANEL (2 INCHES) | SUB PANEL (1 INCH) | | |
|---|---|---|---|---|
| PANEL TRANSMITTANCE | 8% | 5% | 5% | 5% |
| THE NUMBER OF LIGHTENED LEDs | 4chip | 2chip | 2chip | 2chip |
| CURRENT VALUE OF LED | 15mA/chip | 15mA/chip | 30mA/chip | 105mA/chip |
| BRIGHTNESS OF ILLUMINATING DEVICE | 3300cd/m² | 1200cd/m² | 2040cd/m² | 5280cd/m² |
| BRIGHTNESS OF PANEL SURFACE | 264cd/m² | 60cd/m² | 102cd/m² | 264cd/m² |

ILLUMINATING DEVICE, ELECTRO-OPTICAL DEVICE, AND ELECTRONIC APPARATUS

RELATED APPLICATIONS

This application claims priority to Japanese Patent Application Nos. 2003-424697 filed Dec. 22, 2003 and 2004-332739 filed Nov. 17, 2004 which are hereby expressly incorporated by reference herein in their entirety.

BACKGROUND

1. Technical Field

The present invention relates to an illuminating device, and more particularly to a surface emitting type illuminating device suitable for a backlight of a liquid crystal display (LCD) or the like.

2. Related Art

In an LCD, a backlight unit is mounted on a back surface of the liquid crystal panel in order to perform transmitting display. In general, the backlight unit has a light source, a light guiding plate for irradiating lights from the light source onto the back surface of the liquid crystal panel as planar shaped lights, and a sheet for diffusing the lights emitted from the light guiding plate. The light incident onto the light guiding plate from the light source is repeatedly reflected between an exit plane and a reflecting plane of the light guiding plate, which is then emitted outward from the exiting plane.

Recently, dual display type cellular phones are being supplied to the consumer market. In a folding type cellular phone, a display unit (which corresponds to a cover in its structure) is foldably attached to a main body where operating buttons are mounted by means of hinge, and a large display panel is mounted on an inner side (which opposes to the operating buttons) of the display unit, and a small display panel is mounted on an outer side (the back side) of the display unit. That is, the large display panel and the small display panel are mounted in a back-to-back manner. Such an LCD is disclosed in Japanese Patent Laid-Open No. 2003-121655.

In the LCD disclosed in 2003-121655, one backlight unit is mounted in both large liquid crystal panel and small liquid crystal panel. However, a dual display type cellular phone which has two liquid crystal panels disposed in a back-to-back manner and one backlight unit interposed therebetween is also proposed. That is, one light emitting surface of one backlight unit is used for illuminating the large liquid crystal panel while the other light emitting surface is used for illuminating the small liquid crystal panel, so that reduced power consumption, a thin device, and a low manufacturing cost for the device itself can be realized.

In such a dual display type cellular phone, it is not necessary to light the two display panels at the same time, so that any one of the two display panels is typically lighted while the other is turned off. For example, in the above-mentioned cellular phone, when the display unit is opened so as to expose the operating buttons of the main body, a large display panel on an inner side of the display unit may be illuminated, and a small display panel on the outer side of the display unit may be illuminated only when the display unit is closed. However, one backlight unit shared by the two display panels generally emits light onto both panels.

Accordingly, the present invention has been made in consideration of the above-mentioned problems, and it is an object of the present invention to provide an illuminating device which is mounted on an electronic device such as a dual display type cellular phone and which is capable of saving power by illuminating only a necessary panel.

SUMMARY

In one aspect of the present invention, the electro-optical device includes a light guiding plate, a plurality of light sources that illuminate the light guiding plate with light, and a control unit that controls at least one light source among the plurality of the light sources to illuminate independently from the rest of the light sources, a first display panel disposed on one surface of the illuminating device, and a second display panel disposed on the other surface of the illuminating device.

The electro-optical device has an illuminating device having a light guiding plate and a plurality of light sources for having lights incident on the light guiding plate. At least one of the light sources is configured so as to be lighted independently from the rest of the light sources. The illuminating device is dispose between the first display panel and the second display panel. Accordingly, when the first and second display panels are illuminated by the illuminating device or illuminated by other aspect, some of the light sources may be lighted independently from the rest of the light sources, which may prevent an unnecessary lighting operation such that the consumed power may be reduced. As a result, two display panels may be illuminated by one illuminating device, which may lead to a low cost and a thin electro-optical device.

In one aspect of the electro-optical device, the illuminating device has a control unit which controls all the light sources to illuminate in a first mode and fewer of the light sources to illuminate in a second mode than in the first mode. In this case, all light sources are lighted to illuminate a large area or to perform more bright illumination in the first mode, and some of the light sources are lighted to illuminate a small area or perform an illumination in which the brightness is suppressed in the second mode. Accordingly, an unnecessary lighting operation may be prevented so that the consumed power may be reduced.

In other aspect of the electro-optical device, the illuminating device has a first mode and a second mode for illuminating an area smaller than that in the first mode, and lights the light source selected from the light sources to selectively illuminate a portion to be illuminated in the second mode. In the present aspect, a smaller region as compared to the first mode may be positively illuminated in the second mode.

In other aspect of the electro-optical device, the illuminating device has a first mode and a second mode having the brightness lower than that in the first mode, and lights a light source selected from the light sources in the second mode. In the present aspect, a consumed power may be reduced by performing an illumination on the light source selected from the light sources in the second mode having the brightness lower than that in the first mode.

In a preferred example of the electro-optical device, the light sources may be disposed along one side of the light guiding plate, the illuminating device may also have an auxiliary light source disposed at a side opposing the one side of the light guiding plate. The control unit may light the at least one light source and the auxiliary light source in the second mode. In this aspect, it is possible to supplement the luminance by turning on the auxiliary light source in the second mode.

In another preferred example, the light sources are disposed along one side of the light guiding plate, the illuminating device also has an auxiliary light source disposed at a side opposing the one side of the light guiding plate. The control unit further has a third mode for lighting the at least one light source and the auxiliary light source. In this aspect, the illuminating device has the auxiliary light source in addition to the plurality of light sources disposed along one side of the light guiding plate. Accordingly, when the illumination is lack of brightness in the second mode in any arbitrary situation, it is also possible to supplement the brightness by lighting the auxiliary light source in the third mode.

In one aspect of the electro-optical device, a display area of the second display panel is smaller than that of the first display panel. In this aspect, the display areas of the two display panels are different from each other, so that low power consumption is implemented by preventing the light source from unnecessarily being lighted by controlling the lighting for all or some of the light sources in response to any one display panel to be illuminated. For a preferred example, the control unit may perform the lighting control on the first display panel in the first mode when the first display panel is illuminated, and may perform the lighting control on the second display panel in the second mode when the second display panel is illuminated.

In another aspect of the electro-optical device, the electro-optical device further comprises a transflective sheet disposed between the illuminating device and the second display panel. The transflective sheet reflects some of light components emitted from the illuminating device toward the first display panel while transmitting the rest of the light components toward the second display panel. In this aspect, by means of the transflective sheet, lights emitted from the illuminating device toward the second display panel may be reflected toward the first display panel so that they may be used for illuminating the first display panel. Accordingly, the first display panel may be illuminated more brightly using the same illuminating device. In particular, it is effective when the first display panel is a main display panel and the second display panel is an auxiliary display panel between the two display panels.

In another aspect of the electro-optical device, the control unit has an amount of electric current for the light source in the second mode to be different from that in each of the light sources in the first mode. Accordingly, the brightness of each of the first and second modes of the display panel which performs the display using the illuminating device may be properly controlled. To detail this, the control unit may have an amount of electric current in the second mode larger than that in the first mode, so that it is possible to increase the brightness of the display panel in the second mode for lighting only some of the light sources to a required level. In addition, in a detailed method, the control unit determines an amount of electric current in each mode based on the brightness of the illuminating device in each of the first and second modes and the panel transmittance of the display panel illuminated by the illuminating device in each mode.

In another aspect of the present invention, the illuminating device used for the electro-optical device comprises a light guiding plate, a plurality of light sources for having lights incident on the light guiding plate, and a control unit for controlling the lighting of all of the light sources in a first mode and the lighting of at least one light source in a second mode.

The illuminating device may be properly used as a backlight unit of the LCD, and has a light guiding plate, and a plurality of light sources that illuminate the light guiding plate with light. This illuminating device has a control unit that controls all the light sources to illuminate in a first mode and fewer of the light sources to illuminate in a second mode than in the first mode. Accordingly, all light sources may be lighted to illuminate a large area or to perform more bright illumination in the first mode, and some of the light sources are lighted to illuminate a small area or perform the illumination with the suppressed brightness in the second mode. Accordingly, an unnecessary lighting operation may be prevented so that the consumed power may be reduced.

One aspect of the illuminating device has a first mode and a second mode for illuminating an area smaller than that in the first mode. In the second mode, the light source selected from the light sources is lighted to selectively illuminate a portion to be illuminated. In this aspect, an area in the second mode smaller than that in the first mode may be positively illuminated.

Another aspect of the illuminating device has a first mode and a second mode having a luminance lower than that in the first mode, and lights the light source selected from the light sources in the second mode. In this aspect, a consumed power may be reduced by performing an illumination on the light source selected in the second mode having the brightness lower than that in the first mode.

In another aspect of the present invention, an electronic apparatus comprises the above-mentioned electro-optical device. The first display panel is mounted on one surface of the display unit and the second display panel is mounted on the other surface of the display unit. At least one of the light sources is configured so as to be lighted independently from the rest of the light sources, and the illuminating device is disposed between the first display panel and the second display panel. Accordingly, when the first and second display panels are illuminated by the illuminating device or by other aspect, some of the light sources may be lighted on/off independently from the rest of the light sources, which may prevent an unnecessary turn-on operation so that the consumed power may be reduced. As a result, two display panels may be illuminated by one illuminating device, which may lead to a low cost and a thin electro-optical device.

DETAILED DESCRIPTION

Hereinafter, preferred embodiments of the present invention will be described with reference to accompanying drawings.

First Embodiment

Figure 1:
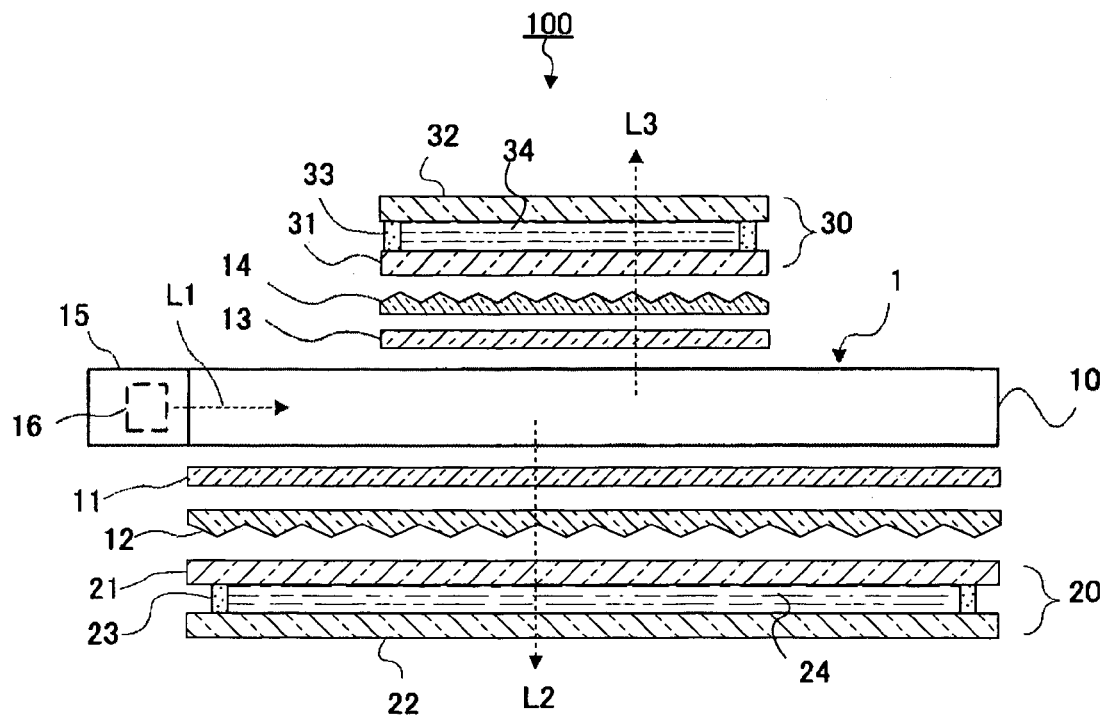
FIG. 1 is a cross-sectional view illustrating a schematic configuration of an illuminating device in accordance with a first embodiment of the present invention.

FIG. 1 is a side view illustrating a schematic configuration of the display device 100 to which an illuminating device of the present invention is applied. In addition, for simplicity of description, each constituent component is shown to be spaced from each other in FIG. 1, however, they overlap with each other in upper and down directions of the drawing to constitute the display device 100.

The display device 100 is a so called a both surface display type panel, in which respective liquid display panels 20 and 30 are arranged at upper and lower sides of an illuminating device 1 comprised of a light source portion 15 and a light guiding plate 10. The light source portion 15 has a plurality of LEDs 16 as point light sources. Light L1 emitted from each LED 16 is incident on the light guiding plate 10 as shown in FIG. 1, which is reflected within upper and lower surfaces of the light guiding plate 10 to change its direction, and exits outward from the top and bottom surfaces of the light guiding plate 10 as illumination lights L2 and L3.

The liquid crystal panel 20 corresponds to the main display panel of the both surface display type cellular phone, and has a display area almost same as the light-emitting area of the light guiding plate 10. The liquid crystal panel 20 is configured so that a pair of transparent substrates 21 and 22 such as glass is sealed by a sealing member 23 to form a cell configuration, and a liquid crystal 24 is injected between the pair of transparent substrates. In addition, there is no specific limit in the configuration of the liquid crystal panel in the present invention.

A diffusion sheet 11 and a prism sheet 12 are disposed between the illuminating device 1 and the liquid crystal panel 20. The diffusion sheet 11 serves to diffuse the light L2 emitted from the light guiding plate 10 to make the brightness within the emitting surface of the illuminating device 1 uniform. The prism sheet 12 serves to focus the light L2 which has transmitted the diffusion sheet 11 onto the back surface of the liquid crystal panel 20 (i.e. the back surface of the substrate 21), and is shaped such that a prism having an almost triangle for its cross-section is extended along one side (i.e. a direction of a side vertical to the cross-section). By means of this configuration, the light L2 emitted from the light guide 10 is subjected to the diffusion sheet 11 and the prism sheet 12 to illuminate the liquid crystal panel 20.

In addition, one prism sheet 12 is used for the example of FIG. 1, however, two prism sheets may be disposed to overlap with each other. In this case, the side where the prism shape of each prism sheet is extended is orthogonal to each other. By means of this configuration, a focusing efficiency of the light emitted from the light guiding plate 10 may be enhanced.

In the meantime, the liquid crystal panel 30 is smaller than the liquid crystal panel 20, and has a display area smaller than that of the liquid crystal panel 20. The liquid crystal panel 30 corresponds to a sub display panel (i.e. a small-sized display panel mounted on the back surface of the main display panel) of the above-mentioned both surface display type cellular phone. The liquid crystal panel 30 is also configured such that a pair of substrates 31 and 32 such as glass is sealed by a sealing member 33 and a liquid crystal 34 is injected between the pair of substrates. In addition, the configuration of the liquid crystal panel 30 is not limited to a specific one in the present invention.

A diffusion sheet 13 and a prism sheet 14 are also disposed between the liquid crystal panel 30 and the light guiding plate 10. The diffusion sheet 13 serves to diffuse lights emitted from the light guiding plate 10, and the prism sheet 14 serves to focus the lights to guide them toward the back surface of the liquid crystal panel 30. Accordingly, the display area of the liquid crystal panel 30 is illuminated. In addition, two prism sheets may also be mounted on the liquid crystal panel 30 side as is the case with the liquid crystal panel 20.

Figure 2:
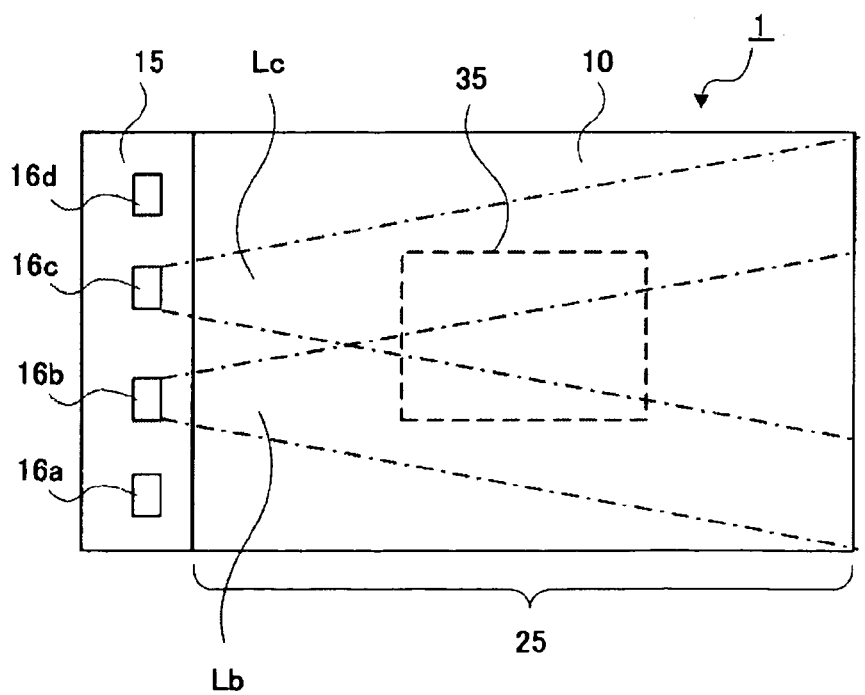
FIG. 2 is a plan view of the illuminating device shown in FIG. 1.

FIG. 2 shows a plan view of the illuminating device 1. As shown in FIG. 2, four LEDs 16a to 16d are disposed in the light source portion 15 at an almost equal interval in a longitudinal direction, and these LEDs emit lights toward the light guiding plate 10. In FIG. 2, the display area 25 of the liquid crystal panel 20 on the main side is almost the same as the light-emitting area of the light guiding plate 10. In the meantime, the display area 35 of the liquid crystal panel 30 on the sub side which is represented as a broken line is smaller than the light-emitting area of the light guiding plate 10, and is positioned almost at a center of the light guiding plate. Accordingly, in order to perform display on the display panel 30 on the sub side, the display area 35 of the display panel 30 on the sub side may be illuminated to some extent even though all of the LEDs 16a to 16d are not turned on.

In the present invention, switching control is performed for lighting the LED 16 in response to a mode in which the liquid crystal display panel 20 on the main side or the liquid crystal display panel 30 on the sub side is displayed. To detail this, when the liquid crystal display panel 20 on the main side is displayed, all of the four LEDs 16a to 16d are lighted. On the contrary, when the liquid crystal display panel 30 on the sub side is displayed, only two LEDs 16b and 16c from the center of the light source portion are lighted as shown in FIG. 2. That is, when the liquid crystal panel 30 on the sub side is used, the LEDs 16a and 16d may remain in a turn-off state. In this case, the brightness of the liquid crystal panel 30 on the sub side becomes reduced as compared to the case of lighting the four LEDs 16a to 16d, however, it may save the consumed power by the reduced brightness.

Figure 3:
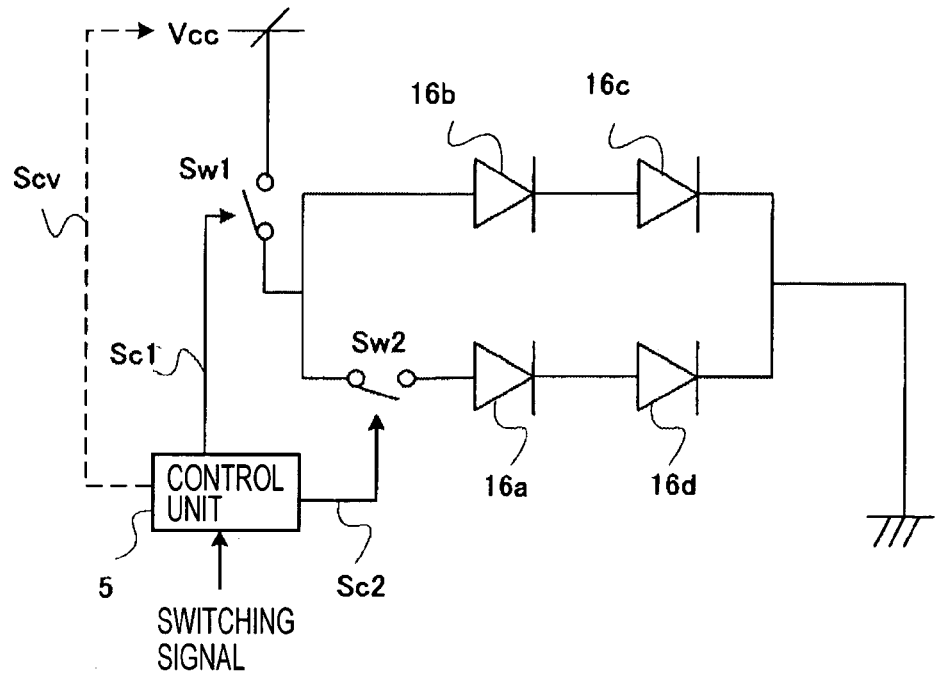
FIG. 3 is an example of a lighting control circuit of the illuminating device shown in FIG. 1.

FIG. 3 shows an example of a switching control circuit for the four LEDs 16a to 16d. Among the four LEDs 16a to 16d shown in FIG. 2, the LEDs 16b and 16c are serially connected to each other, and the LEDs 16a and 16d are serially connected to each other, and these two pairs of the serially connected LEDs are connected in parallel to each other, which is connected between a power supply Vcc and a ground GND. A switch SW1 is disposed between the parallel circuit and the power supply Vcc, and a switch SW2 is disposed between the switch SW1 and the LED 16a. Switching on/off of the switches SW1 and SW2 is performed by the control signals Sc1 and Sc2 from the control unit 5. In addition, a description on the control signal Scv will be described in other embodiment later.

The control unit 5 receives a switching signal from outside, and outputs control signals Sc1 and Sc2 in response to the switching signal. When the switching signal indicates a mode for lighting the liquid crystal panel 20 on the main side (hereinafter, it will be referred to as a main display mode), the control unit 5 outputs the control signals Sc1 and SC2 to allow the switches SW1 and SW2 to be turned on. Accordingly, all of the four LEDs 16a to 16d are supplied with a current to emit respective lights. As a result, all of the display area 25 of the liquid crystal panel 20 shown in FIG. 2 is illuminated.

On the other hand, when the switching signal indicates a mode for lighting the liquid crystal panel 30 on the sub side (hereinafter, it will be referred to as a sub display mode), the control unit 5 turns on the switch SW1 and outputs the control signals Sc1 and Sc2 to allow the switch SW2 to be turned off. Accordingly, a current is supplied only to the LEDs 16b and 16c to emit lights as shown in FIG. 2. As a result, the display area 35 of the liquid crystal panel 30 on the sub side is illuminated only by the lights Lb and Lc from the LEDs 16b and 16c. Accordingly, it is possible to effectively illuminate the liquid crystal panel 30 on the sub side.

In addition, a switching signal for designating any one between the main display mode and the sub display mode is generated in response to the design of the electronic apparatus such as a cellular phone in which the display device of the present embodiment is mounted. In general, in case of the above-mentioned foldable cellular phone, only the liquid crystal panel 20 on the main side is illuminated in the exposed liquid crystal panel on the main side with a display unit being opened, and only the liquid crystal panel 30 on the sub side is illuminated with the display unit being closed. This switching signal may be generated by a device of detecting the closing and opening which is mounted by means of a hinge or the like for connecting the main body to the display unit of the cellular phone. In addition to switching between the main display mode and the sub display mode in response to the closing and opening of the main body and the display unit, a display mode may be switched in response to a user operation of a specific button, or an illuminating device may be automatically turned off after a predetermined time passed from the illumination of the liquid crystal panel on the main side or the sub side. These cases allow a control unit or the like within the cellular phone to output the switching signal based on the user operation of the button of the cellular phone or the predetermined passed time. In addition, the method of generating the switching signal of the display mode is not limited to the above-mentioned examples in the present invention, so that the present invention may be applied to a case of switching the main display mode and the sub display mode in response to various conditions.

As described previously, in the first embodiment, all of the four LEDs 1 are lighted in the main display mode, and only two LEDs are lighted in the sub display mode, so that it is possible to reduce the power consumption.

Second Embodiment

Figure 4:
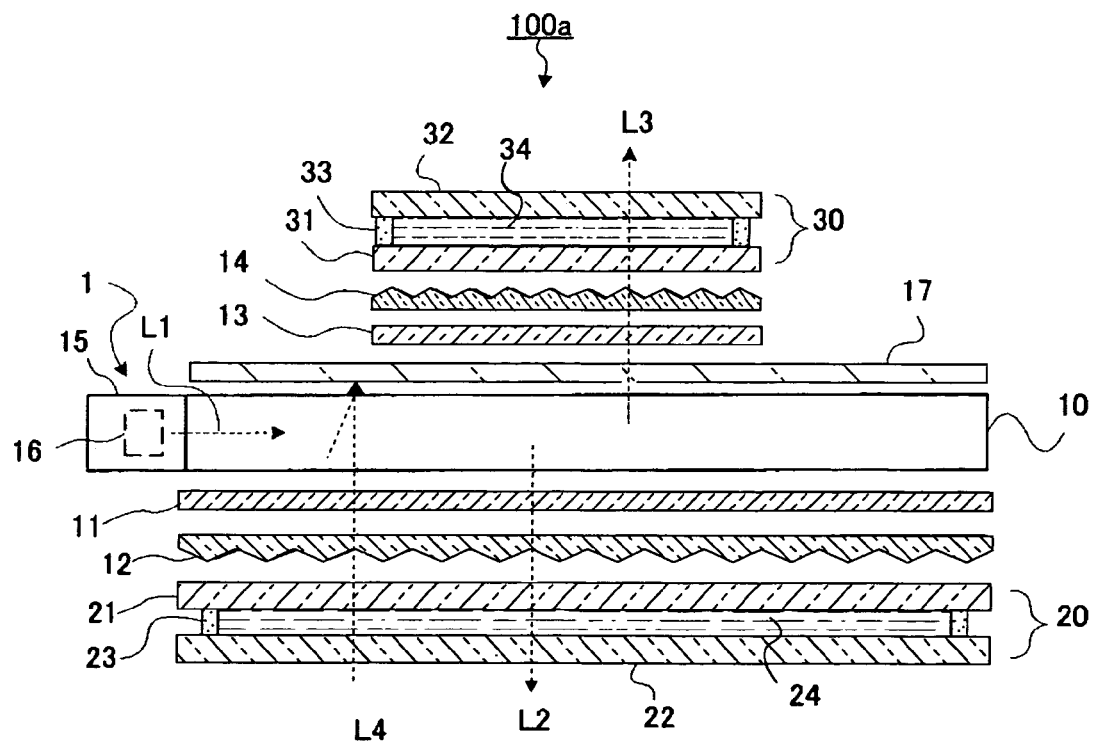
FIG. 4 is a cross-sectional view illustrating a schematic configuration of an illuminating device in accordance with a first embodiment of the present invention.

FIG. 4 shows a configuration of the display device in accordance with a second embodiment of the present invention. The display device 100a according to the second embodiment differs from the display device 100 of the first embodiment in that the transflective sheet 17 is mounted on the side of the liquid crystal panel 30 of the illuminating device 1, but the rest part is same as the first embodiment. Accordingly, the same elements as that of the display device 100 in the first embodiment are denoted by the same reference numerals and descriptions thereof will be omitted.

As shown in FIG. 4, the transflective sheet 17 is disposed between the light guiding plate 10 and the diffusing sheet 13. The transflective sheet 17 allows some of received lights to be transmitted at a predetermined ratio and the rest to be reflected. Accordingly, the lights emitted from the light guiding plate 10 at the predetermined ratio as the light L3 are irradiated onto the liquid crystal panel 30 on the sub side, and the rest of the lights are reflected by the transflective sheet 4 as the light L4 to be irradiated onto the liquid crystal panel 20 on the main side. When the transflective sheet 17 is not present, lights incident on the light guiding plate 10 from the light source portion 15 are irradiated onto the liquid crystal panel 30 on the sub side and the liquid crystal panel 20 on the main side at an almost equal ratio. However, by means of presence of the transflective sheet 17, some of lights emitted from the light guiding plate 10 toward the liquid crystal panel 30 on the sub side are reflected by the transflective sheet 17 to be irradiated onto the liquid crystal panel 20 on the main side. Accordingly, the liquid crystal panel 20 on the main side may be illuminated more brightly using the same illuminating device 1. The brightness of the liquid crystal panel 30 on the sub side is reduced by the increased brightness.

The rest part except the above-mentioned difference is the same as the first embodiment. Accordingly, the illuminating device 1 has the configuration shown in FIG. 2 even in the display device 100a of the second embodiment, and may allow four LEDs to be selectively lighted in response to the switching of the main display mode and the sub display mode, so that a lower power consumption may be implemented.

EXAMPLES OF ILLUMINATING DEVICE

Next, other example of the illuminating device 1 will be described. The illuminating device 1 shown in FIG. 2 has four LEDs 16 within the light source portion 15. All of the four LEDs 16 are lighted to illuminate the liquid crystal panel 20 on the main side in the main display mode, and only two central LEDs 16b and 16c are lighted to illuminate the liquid crystal panel 30 on the sub side in the sub display mode. In any one of the first embodiment and the second embodiment, any one of the illuminating devices 1b to 1d to be described later may be employed instead of the above-mentioned illuminating device 1.

First Example

Figure 5:
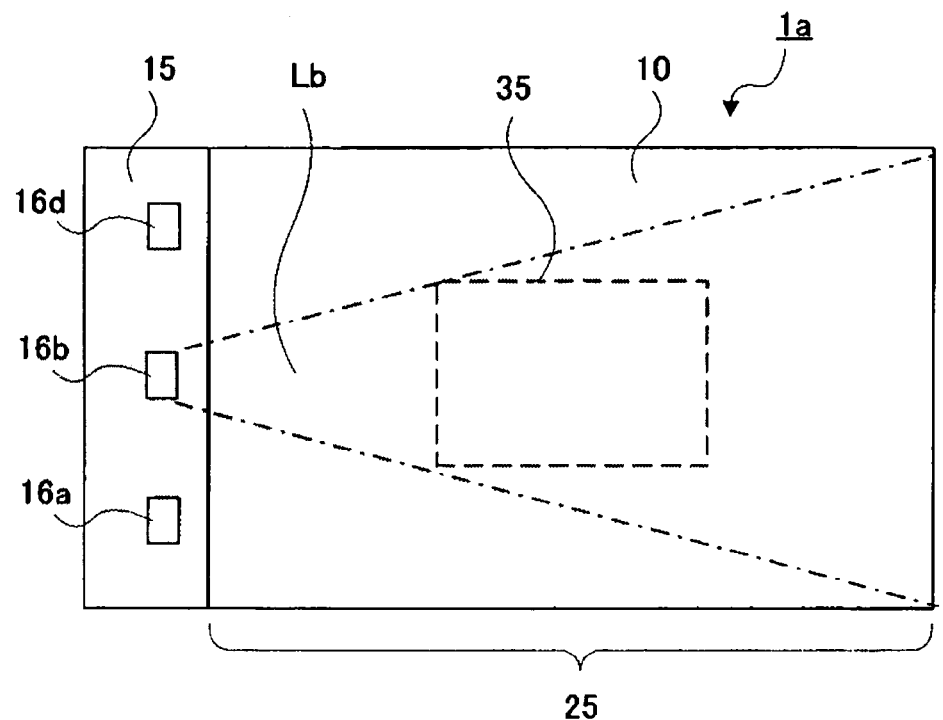
FIG. 5 is a plan view of another example of the illuminating device.

FIG. 5 shows another example of the illuminating device 1a. FIG. 5 is a plan view of the illuminating device 1a. As shown in FIG. 5, the illuminating device 1a has three LEDs 16a, 16b, and 16d within the light source portion 15. Accordingly, all of the three LEDs are lighted to illuminate the liquid crystal panel 20 in the main display mode. Alternatively, only the central LED 16b is lighted to illuminate the liquid crystal panel 30 by only the light Lb in the sub display mode. Also in this embodiment, two LEDs 16a and 16d are turned off in the sub display mode so that the low power consumption is implemented.

In addition, in the illuminating device 1a according to the present example, it is possible to remove the LED 16c in the circuit configuration of FIG. 2 as the switching circuit for lighting operation.

Second Example

Figure 6:
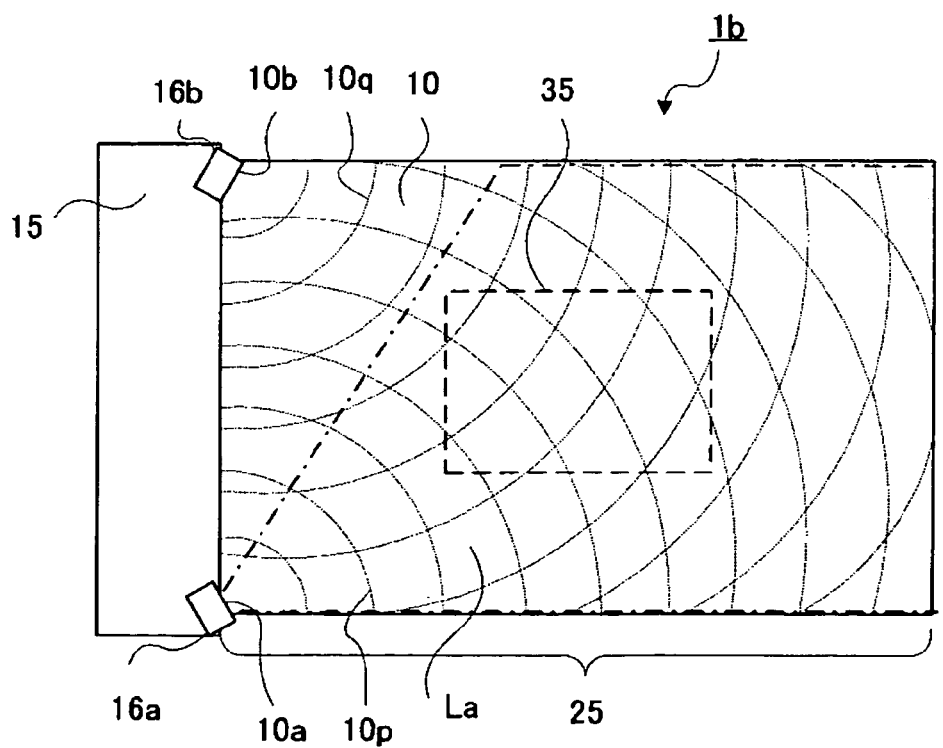
FIG. 6 is a plan view of further another example of the illuminating device.

FIG. 6 shows another example of the illuminating device 1b. FIG. 6 is a plan view of the illuminating device 1b. The illuminating device 1b has two LEDs 16a and 16b within the light source portion 15 as shown in FIG. 6.

Specifically, a corner portion of a cross section on the light source portion 15 of the light guiding plate 10 is chamfered so as to be approximately orthogonal to a straight line (i.e. a diagonal line) of connecting the corner portion to a diagonally positioned corner potion, so that chamfered planes 10a and 10b are formed. LEDs 16a and 16b are disposed so as to oppose the chamfered planes 10a and 10b, respectively.

In addition, a plurality of circular arc-shaped grooves 10p and 10q are formed on the bottom surface (lower surface in FIG. 1) of the light guiding plate 10. Specifically, a plurality of circular arc-shaped grooves 10p are concentrically formed with the LED 16a being a center, and an inclination plane on the LED 16a side among two inclination planes forming the groove 10p is an effective inclination plane reflecting lights from the LED 16a toward the liquid crystal panel 30. Similarly, a plurality of circular arc-shaped grooves 10q are concentrically formed with the LED 16b being a center, and an inclination plane on the LED 16b side among two inclination planes forming the groove 10q is an effective inclination plane reflecting lights from the LED 16b toward the liquid crystal panel 30.

In the main display mode, two LEDS are lighted at both sides to illuminate the liquid crystal panel 20 on the main side. Alternatively, in the sub display mode, any one of the two LEDs 16a and 16b is lighted to illuminate the liquid crystal panel 30 on the sub side. In the present embodiment, any one of the two LEDs is turned off in the sub display mode, thereby implementing low power consumption.

In addition, when only one LED is set to be always lighted in the sub display mode, only the LED is turned off, so that it is possible to light other LED in the previous time when the mode change is made in the sub display mode. Specifically, the LED may be selected such that only the LED 16a may be lighted in the first sub display mode, only the LED 16b may be lighted in the second sub display mode, and the only the LED 16a may be lighted again in the third sub display mode.

In the illuminating device 1b of the present embodiment, switches are serially disposed at one or both of the two LEDs 16a and 16b, and a control unit 5 may perform switching between the case of lighting the two LEDS and the case of lighting one of the two LEDs.

Third Example

Figure 7:
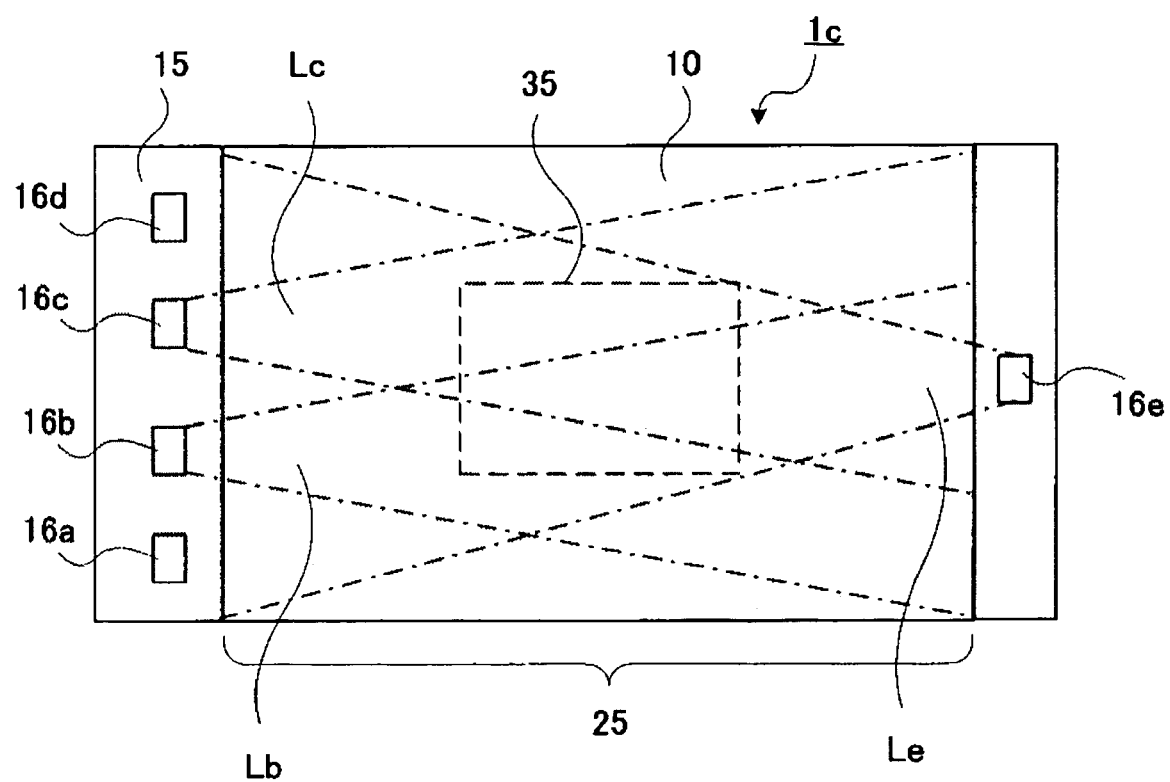
FIG. 7 is a plan view of still further another example of the illuminating device.

FIG. 7 shows another example of the illuminating device. FIG. 7 is a plan view of the illuminating device 1c. As shown in FIG. 7, this illuminating device 1c has one auxiliary light source 16e on a side opposing the light source portion 15 in addition to the illuminating device 1 shown in FIG. 2. The brightness of the liquid crystal panel 30 on the sub side may be increased in the sub display mode by mounting an LED 16e as the auxiliary light source. Specifically, a sub display mode having a typical brightness (i.e. a typical sub display mode), and a sub display mode having a brightness brighter than the typical mode (i.e. a sub display mode having a high brightness) may be implemented as the sub display mode.

Specifically, four LEDs 16a to 16d are lighted to illuminate the liquid crystal panel 20 on the main side in the main display mode. In addition, two LEDs 16b and 16c within the light source portion 15 are lighted to illuminate the liquid crystal panel on the sub side in the typical sub display mode. In the sub display mode having the high brightness, the LED 16e as the auxiliary light source is lighted in addition to the LEDs 16b and 16c to illuminate the liquid crystal panel 30 on the sub side. Accordingly, the liquid crystal panel 30 on the sub side may be displayed brightly by an amount of illumination of the LED 16e as the auxiliary light source.

Accordingly, when the sub display mode needs to be displayed brightly in any reasons, the electronic apparatus such as a cellular phone may be configured to perform a display in the sub display mode having the high brightness. For example, when the sub display mode is automatically selected in response to the opening/closing operation of the foldable type cellular phone, two LEDs 16b and 16c are lighted to illuminate the liquid crystal panel 30 on the sub side in the typical sub display mode, and when the sub display mode is intentionally selected by an user operating a specific button, three LEDS 16b, 16c, and 16e may be lighted in the sub display mode having the high brightness.

In addition, when the illuminating device 1c according to the present example is mounted on the display device of above-mentioned second embodiment, the display in the sub display mode may be illuminated brightly. Specifically, in the second embodiment, the sub display mode becomes dark by an amount of brightness in which the main display mode becomes bright by mounting the transflective sheet 17, however, when the illuminating device 1c according to the present example is mounted and a display is performed in the sub display mode having the high brightness, it is possible to supplement the brightness by the amount.

In addition, in the present example, the LED 16e as the auxiliary light source may be lighted even in the main display mode if necessary. In addition, it is also possible to light the LEDs 16a to 16d in the main display mode and to light only the auxiliary light source 16e in the sub display mode.

In the illuminating device 1c of the present example, as a switching circuit for lighting operation, the LED 16e may be connected in parallel to a parallel connection between the serial connection of LEDs 16b and 16c and the serial connection of LEDs 16a and 16d in the circuit configuration shown in FIG. 3, and may perform the lighting operation for the LED 15e by means of the control unit 5.

Control of Current Amount of LED for Each Display Mode

Next, a control on changing an amount of the current flowing through each LED per display mode will be described. When the amount of electric current of each LED is changed, a control signal Scv shown as a broken line in FIG. 3 is used. That is, as described with the above-mentioned each example, the control unit 5, in addition to control of the switches SW1 and SW2 by means of the control signals Sc1 and Sc2, outputs the control signal Scv for controlling an electric characteristic to the power supply Vcc to change the voltage of the power supply Vcc, so that the amount of electric current for each LED is changed. In addition, instead of a method of controlling the amount of electric current flowing toward each LED by having the control unit 5 control the power supply Vcc as described above, a command system other than the control unit 5 may be employed to control the amount of electric current flowing toward each LED.

Next, the control of the current amount of the LED 16 in the main display mode and the sub display mode will be described. In the illuminating device 1 of the first embodiment 1 shown in FIG. 2, only LEDs 16b and 16c are lighted in the sub display mode. In this case, the surface brightness of the liquid crystal panel 30 on the sub side becomes lower than that of the liquid crystal panel 30 on the sub side when all LEDs 16a to 16d are lighted. By means of this configuration, the amount of electric current flowing through the LEDs 16b and 16c may be adjusted in response to brightness of the panel surface in the sub display mode when brightness of the panel surface is lacked in the sub display mode, so that the surface brightness of the liquid crystal display panel 30 on the sub side may be adjusted in the sub display mode.

Figures 8A, 8B:
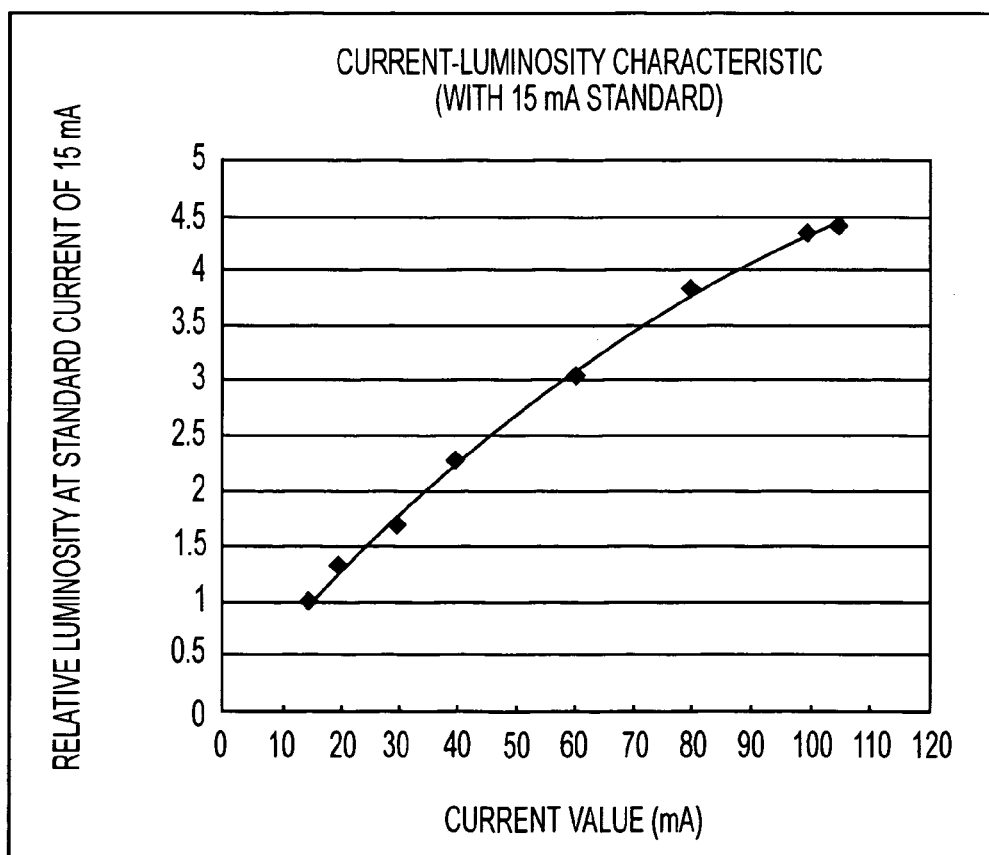
FIG. 8 is a view for explaining a method of controlling a current value of each display mode.

FIG. 8A shows an example in which brightness of the panel surface is set in one example of the display device 100 in accordance with the first embodiment. In the present example, the panel size of the liquid crystal panel 30 corresponding to the main panel is 2 inches and its panel transmittance is 8%, while the panel size of the liquid crystal panel 20 corresponding to the sub panel is 1 inch and its panel transmittance is 5%. In addition, the number of LED lighted LEDs is four of LEDs 16a to 16d 4 in total in the main display mode and two of LEDs 16b and 16c in total in the sub display mode as shown in FIG. 2.

FIG. 8B is a graph showing an electric current value of one LED used in the present example and luminosity obtained from the LED (which is normalized to a value when the electric current value is 15 mA).

In the main display mode, when the all of the four LEDs 16a to 16d are lighted by the electric current of 15 mA, the brightness of the illuminating device 1 becomes 3300 cd/m$^2$, and brightness of the panel surface of the liquid crystal panel 20 as the main panel becomes 264 cd/m$^2$.

On the contrary, in the sub display mode, when two LEDs 16b and 16c are also lighted by the electric current of 15 mA, the brightness of the illuminating device 1 becomes 1200 cd/m$^2$, and brightness of the panel surface of the liquid crystal panel 30 as the sub panel becomes 60 cd/m$^2$. In addition, when the current value of each LED is increased to light the two LEDs 16b and 16c with 30 mA, the brightness of the illuminating device 1 becomes 2040 cd/m$^2$, and the brightness of the panel surface of the liquid crystal panel 30 as the sub panel becomes 102 cd/m$^2$. In addition, when the current value of each LED is increased to light the two LEDs 16b and 16c with 105 mA, the brightness of the illuminating device 1 becomes 5280 cd/m$^2$, and the brightness of the panel surface of the liquid crystal panel 30 as the sub panel becomes 264 cd/m$^2$.

Accordingly, when the amount of electric current toward four LEDs 16a to 16d in the main display mode is set to be the same as that toward two LEDs 16b and 16c in the sub display mode, brightness of the panel surface of the sub panel becomes 60 cd/m$^2$, which is quite dark as compared to the main display mode. On the contrary, when the amount of electric current toward two LEDs 16b and 16c increases to 30 mA in the sub display mode, brightness of the panel surface of the sub panel becomes 102 cd/m$^2$, which is bright to be almost ½ of that in the main display mode. In addition, when the amount of electric current toward the two LEDs 16b and 16c increases to 105 mA in the sub display mode, the brightness of the panel surface of the sub panel becomes 264 cd/m$^2$, which is equal to the brightness of the panel surface of the main display mode.

In an actual cellular phone, the sub display mode is auxiliary used, and simple and easy information such as time, remaining amount of battery power or the like is mainly displayed, so that brightness of a panel surface high enough for the main display mode is not required in many cases. The brightness required for the liquid crystal panel of the cellular phone typically has 250 cd/m$^2$ for the main display mode and 100 cd/m$^2$ for the sub display mode, and it is considered to be actual that the amount of electric current toward the two LEDs 16b and 16c are set to about 30 mA in the sub display mode and brightness of the panel surface of the sub panel is set to about ½ of that of the main display mode in the above-mentioned example.

As such, when the number of lighted LEDs in the sub display mode is reduced, it is preferable to control the amount of electric current flowing toward the LED in response to the brightness of the panel surface which is required in the sub display mode in design.

There exists several factors of affecting brightness of the panel surface, however, when the brightness of the illuminating device and the panel transmittance are considered as main factors, a following equation is obtained:

The brightness of panel surface=the brightness of the illuminating device×panel transmittance (1)

Accordingly, a current value of LED necessary for obtaining a required brightness of panel surface may be calculated using the equation 1.

For example, considering a design specification, when a required brightness of panel surface in the sub display mode is already given, since the required panel transmittance is known, the required brightness of the illuminating device is calculated based on the equation 1, and the current value of LED is preferably set so as to obtain the required brightness of the illuminating device.

In addition, considering a design specification, when a required brightness of panel surface in the sub display mode is given with a rate to brightness of the panel surface in the main display mode (e.g. ½ of the main display mode), brightness of the panel surface in the main display mode is first calculated based on the equation 1, which is then multiplied by the rate to calculate the required brightness of panel surface. The equation 1 is used again to calculate the required brightness of the illuminating device, and the current value of LED is preferably set so as to obtain the required brightness of the illuminating device.

In addition, the above-mentioned embodiment is described based on the illuminating device 1 shown in FIG. 2, however, it may also be applied to the typical sub display mode for the display device 1 using the illuminating device 1c shown in FIG. 7. In addition, when the illuminating device 1a shown in FIG. 5 is used, the number of the LED to be turned on in a sub display mode is preferably one.

Electronic Apparatus

Figure 9:
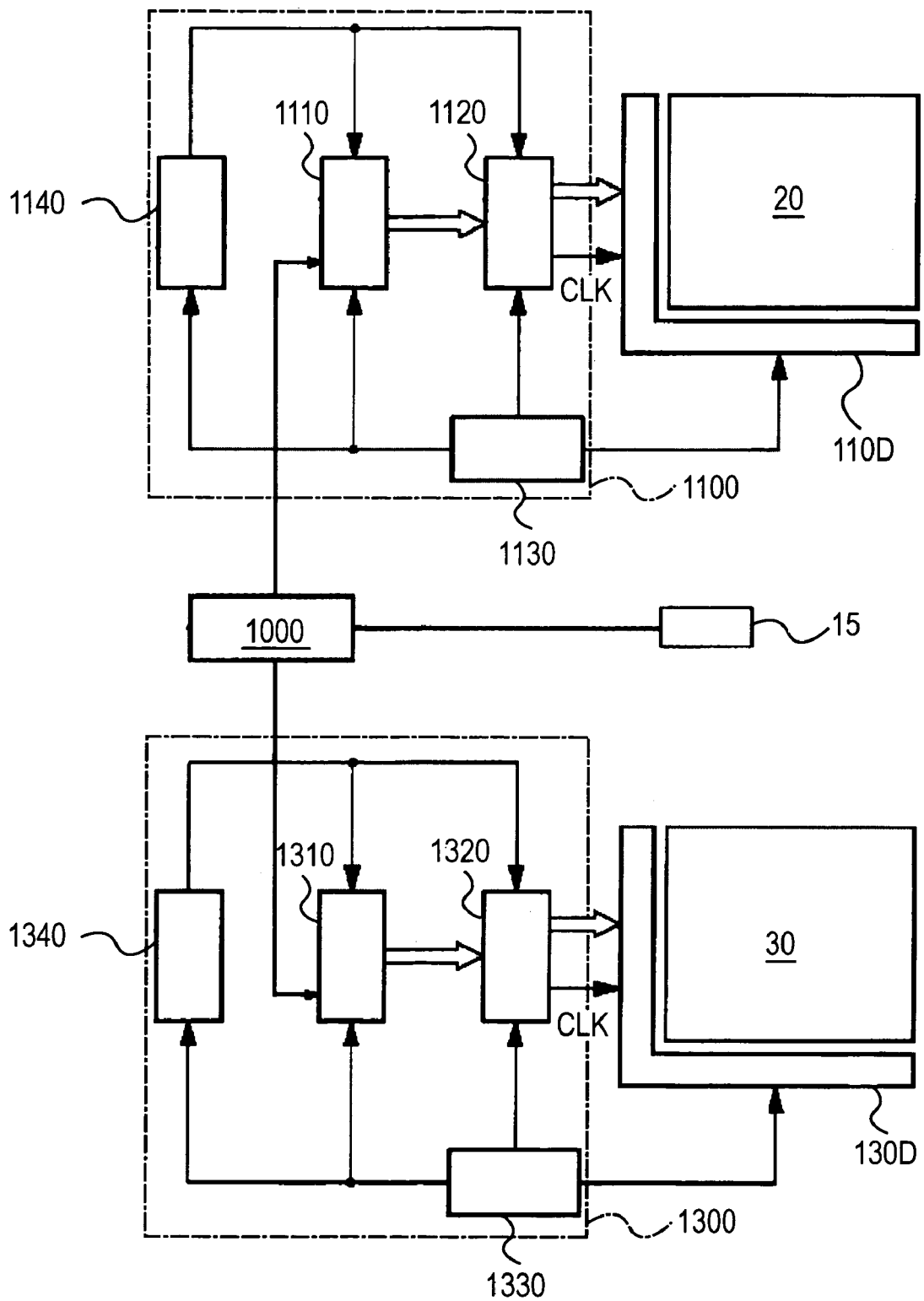
FIG. 9 is a block diagram illustrating a configuration example of an electronic apparatus.

Next, an embodiment of the electronic apparatus having the display device 100 or 100a will be described with reference to FIGS. 9 and 10. The electronic apparatus of the present embodiment has a control means 1100 for controlling the liquid crystal panel 20, and a control means 1300 for controlling the liquid crystal panel 30 as shown in FIG. 9. The control means 1100 and 1300 are controlled by the central control unit 1000 comprised of a microcomputer and so forth mounted within the electronic apparatus.

The liquid crystal panel 20 and 30 are mounted on a panel or connected to the driving circuits 110D and 130D consisted of semiconductor ICs through an interconnection member with respect to the panel, and these driving circuits 110D and 130D are connected to the control means 1100 and 1300. The control means 1100 and 1300 have display information output sources 1110 and 1310, display processing circuits 1120 and 1320, power supply circuits 1130 and 1330, and timing generators 1140 and 1340.

The display information output sources 1110 and 1310 have a memory comprised of Read Only Memory (ROM) or Random Access Memory (RAM), a storage unit comprised of a magnetic recording disk or an optical recording disk, and a tuning circuit for tuning and outputting a digital image signal, and supply the display information to the display information processing circuits 1120 and 1320 as the image signal having a predetermined format based on various clock signals generated by the timing generators 1140 and 1340.

The display information processing circuits 1120 and 1320 have various well known circuits such as a serial-parallel converting circuit, an amplifying/inverting circuit, a rotation circuit, a gamma correction circuit, and a clamping circuit, and perform the processing of input display information, thereby supplying the image information with the clock signal CLK to the driving circuit. The driving circuits 110D and 130D include a scan line driving circuit, a data line driving circuit, and a test circuit. In addition, the power supply circuits 1130 and 1330 supply a predetermined voltage to each of the above-mentioned constituent components.

The central control unit 1000 properly outputs a lighting on/off instruction or original data of display information to the display information output sources 1110 and 1130 of the control means 1100 and 1300, and outputs the corresponding display information to the display information output sources 1110 and 1310, thereby having a proper display image displayed on the liquid crystal panels 20 and 30 through the control means 1100 and 1300 and the driving circuits 110D and 130D. In addition, the central control unit 1000 is configured to perform lighting on/off control also on the light source portion 15.

FIG. 10 shows a cellular phone 2000 as an embodiment of the electronic apparatus in accordance with the present invention. This cellular phone 2000 has a main body 2001 in which various operating buttons are mounted and a microphone is built, and a display unit 2002 having a display screen or an antenna and a built-in speaker, in which the main body 2001 and the display unit 2002 are configured to be freely folded to each other. The display device 100 is built in the display unit 2002 in which a display screen of the liquid crystal panel 20 on the main side is configured to be visually identified on its inner surface of the display device, and a display screen of the liquid crystal panel 30 on the sub side is configured to be visually identified on its outer surface of the display device.

Figure 10A:
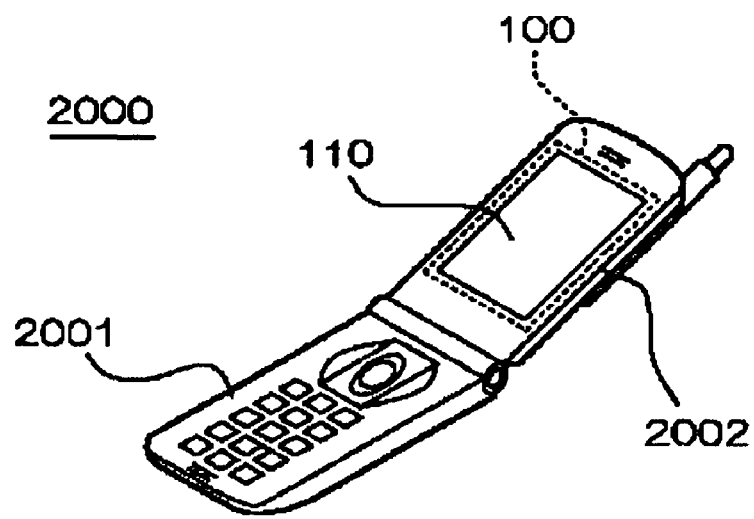
FIG. 10 is a perspective view illustrating an appearance of a cellular phone as one example of the electronic apparatus.
Figure 10B:
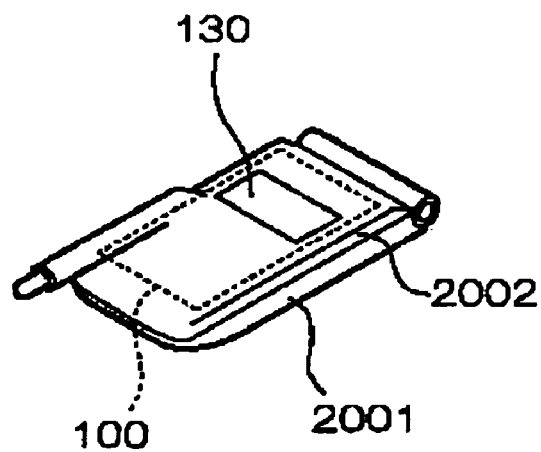

In the present embodiment, when the display unit 2002 is opened from the main body 2001 as shown in FIG. 10A, the liquid crystal panel 20 on the main side is lighted by an instruction from the central control unit 1000, and a predetermined image is displayed. In addition, when the display unit 2002 is folded on the main body 2001 as shown in FIG. 10B, the liquid crystal panel 20 on the main side is lighted off while the liquid crystal panel 30 on the sub side is lighted to allow a predetermined image to be displayed.

In addition, the electro-optical device and the electronic apparatus of the present invention are not limited to the above-mentioned examples, but may be subjected to various changes within the scope of the gist of the present invention. For example, the liquid crystal panel is used as the electro-optical panel in each of the above-mentioned embodiments, however, an organic electro-luminescent panel, a plasma display panel, a field emission display and so forth may be employed as the electro-optical panel of the present invention. In addition, a passive matrix type liquid crystal panel is mainly shown in the above-mentioned embodiments, however, the present invention may also be applied to an active matrix type liquid crystal panel.

What is claimed is:

1. An electro-optical device comprising:
   an illuminating device including:
      a light guiding plate;
      a plurality of light sources that illuminate the light guiding plate with light; and
      a control unit that controls at least one light source among the plurality of the light sources to illuminate independently from the rest of the light sources;
   a first display panel disposed on an upper surface of the illuminating device; and
   a second display panel disposed on a lower surface of the illuminating device;
   wherein the control unit illuminates all the light sources in a first mode and less than all the light sources in a second mode;
   wherein the control unit controls an amount of electric current supplied to each light source illuminated in the second mode to be larger than an amount of electric current supplied to each light source illuminated in the first mode; and
   wherein the control unit determines the amount of electric current supplied to each light source illuminated in the first mode and the amount of electric current supplied to each light source illuminated in the second mode, based on a panel transmittance of the first display panel and a panel transmittance of the second panel, to illuminate the second panel operated in the second mode at a brightness that is about half of a brightness of the first panel operated in the first mode.

2. The electro-optical device according to claim 1, wherein the light sources are disposed along one side of the light guiding plate, the illuminating device also has an auxiliary light source disposed at a side opposing the one side of the light guiding plate, and the control unit lights the at least one light source and the auxiliary light source in the second mode.

3. The electro-optical device according to claim 1, wherein the light sources are disposed along one side of the light guiding plate, the illuminating device also has an auxiliary light source disposed at a side opposing the one side of the light guiding plate, and the control unit further has a third mode for lighting the at least one light source and the auxiliary light source.

4. The electro-optical device according to claim 1, wherein a display area of the second display panel is smaller than that of the first display panel.

5. The electro-optical device according to claim 4, wherein the control unit performs lighting control in the first mode when the first display panel is illuminated, and performs lighting control in the second mode when the second display panel is illuminated.

6. The electro-optical device according to claim 1, further comprising:
   a transflective sheet disposed between the illuminating device and the second display panel,
   wherein the transflective sheet reflects a portion of light components emitted from the illuminating device toward the first display panel while transmitting the rest of the light components toward the second display panel.

7. An electronic apparatus comprising:
   an electro-optical device according to claim 1 in a display unit,
   wherein the first display panel is mounted on a first surface of the display unit and the second display panel is mounted on a second surface of the display unit.

* * * * *